UNITED STATES PATENT OFFICE 2,489,950

BASIC-ALKYL ESTERS AND THEIR SALTS

Frederick F. Blicke, Washtenaw County, Mich., assignor to Regents of the University of Michigan, Ann Arbor, Mich., a corporation of Michigan No Drawing. Application February 26, 1944,
Serial No. 524,086

2 Claims. (Cl. 260—294)

The present invention is particularly concerned with basic-alkyl esters of alpha-naphthyl-acetic acid and alpha-naphthyl-acetic acids substituted with a hydrocarbon radical on the carbon atom alpha to the carboxyl grouping, and salts thereof and relates particularly to beta-piperidino-ethyl-alpha-(alpha-naphthyl) - normal-butyrate hydrochloride and its salts.

Members of this class of compounds have been prepared and found to have value as antispasmodics and as intermediates in the preparation of more complex organic derivatives. The generic formula for the free basic-alkyl esters is

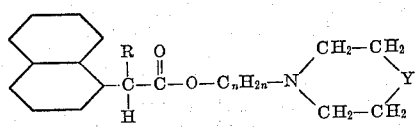

wherein R represents hydrocarbon or hydrogen, $n$ is an integer from 2 to 4, inclusive, and Y represents one of the groups —$CH_2$—, —O—, —NH—, and —S—. The heterocyclic radicals represented by the structure

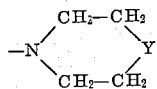

are piperidino, piperazino, thiomorpholino, and morpholino. Among the hydocarbon radicals represented by R are lower-alkyl, aryl, cycloalkyl, aralkyl, and alkenyl. The free basic-alkyl esters of alpha-naphthyl-acetic and substituted acetic acids falling within the scope of the foregoing formula are oily liquids or low melting solids readily soluble in many organic solvents, difficultly soluble in water, and distilling with some decomposition at high temperatures and under reduced pressure. The acid salts of these basic-alkyl esters are solids at ordinary temperatures, and relatively soluble in water.

The compounds may be prepared by reacting a suitable acid, e. g. alpha-naphthyl-acetic acid, alpha-(alpha-naphthyl)-phenylacetic acid, alpha - (alpha-naphthyl) - phenyl-propionic acid, alpha - (alpha - naphthyl)-cyclohexylacetic acid, or alpha-(alpha-naphthyl)-normalhexenoic-delta-4 acid with a basic-alkyl halide such as beta-morpholino-ethyl chloride, beta-piperidino-ethyl chloride, delta-morpholino-normalbutyl bromide, beta-piperazino-ethyl iodide, gamma-thiomorpholino-propyl chloride, etc. This is conveniently accomplished by heating substantially equimolecular proportions of the acid and halide together, preferably in the presence of a low-boiling organic solvent, e. g. isopropyl alcohol, butyl alcohol, benzene, etc., and thereafter evaporating the solvent under reduced pressure to obtain the reaction product as a residue. If desired, this residue may be fractionally recrystallized from a suitable solvent or solvent mixture. This procedure is productive of the hydrohalide of the basic-alkyl ester of the acid selected. The free ester may be obtained by treatment of this hydrohalide product with ammonia, sodium carbonate, or other suitable alkaline material. Salts other than the hydrohalide may be prepared from the free basic-alkyl esters by reaction with the corresponding acid or acid anhydride or by treatment of the hydrohalide with a selected salt of the desired acid to bring about double decomposition, but under such conditions as not to induce hydrolysis of the ester.

An alternative method for the preparation consists of reacting thionyl chloride with a selected alpha-naphthyl-acetic acid to produce the corresponding acid chloride. The latter compound is reacted with an excess of a suitable basic-alkanol, e. g. beta-piperidino-ethanol, beta-morpholino-ethanol, gamma-morpholino-propanol, etc. in an inert solvent such as benzene. This is conveniently carried out by heating the mixture to the boiling temperature of the solvent and under reflux for the period of time necessary to accomplish the reaction. A portion of the basic-alkanol hydrochloride may precipitate from the reaction mixture and is recoverable by filtration. The filtrate from this operation may be evaporated under reduced pressure to separate the solvent and obtain the free basic-alkyl ester of the alpha-(alpha-naphthyl) substituted acid. Further operation may comprise treating a dispersion of the free ester in an organic solvent with gaseous hydrogen halide to precipitate the basic-alkyl ester hydrohalide which is separated. Where it is desired to produce salts other than the hydrohalides, the free basic-alkyl ester or the crude solution thereof as obtained above may be reacted with a suitable free acid such as acetic acid, sulfuric acid, methyl sulfuric acid, etc., or an acid anhydride.

The preferred embodiment of the invention consists of the hydrochlorides of the basic-alkyl esters formed according to the above methods. These compounds have the generic formula

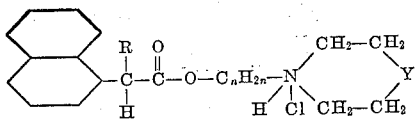

wherein R, Y and *n* have the values heretofore given. These hydrochlorides are high-melting crystalline solids difficultly soluble in most organic solvents and soluble in water.

The alpha - naphthyl - acetic, alpha - (alpha-naphthyl)-propionic, and alpha-(alpha-naphthyl)-phenylacetic acids employed as reactants in the preparation of certain of the compounds of the present invention are known.

The alpha-(alpha-naphthyl)-butyric, pentanoic, and hexanoic acids may be prepared from diethyl alpha-naphthylmalonate. In this operation, the latter compound is reacted with powdered metallic sodium in benzene and thereafter with ethyl, propyl, or butyl iodide. Any unreacted sodium is subsequently destroyed by the addition of alcohol to the mixture. Diethyl ether and water are then added in appreciable quantity to the mixture, and the ether-benzene layer separated. The latter is washed with aqueous sodium thiosulfate and distilled to obtain the diethyl alkyl-alpha-naphthylmalonate corresponding to the alkyl iodide employed. The diethyl alkyl-alpha-naphthylmalonate is reacted with alcoholic potassium hydroxide, the alcohol distilled from the mixture under reduced pressure, and the residue dissolved in water, cooled, and neutralized with hydrochloric acid; 2-(alpha-naphthyl)-2-alkyl-malonic acid is thereby precipitated. This product is separated and heated to 180° C. to accomplish decarboxylation and obtain the desired alpha-(alpha-naphthyl)-butyric, pentanoic, or hexanoic acid. Such crude product may be further purified according to known procedures.

The alpha-(alpha-naphthyl)-propionic acid melts at 148°–149° C. Alpha-(alpha-naphthyl)-normalbutyric acid melts at 86°–87° C. Alpha-(alpha-naphthyl)-normalpentanoic acid is an oil boiling at 190° C. at 4 millimeters pressure. Alpha - (alpha - naphthyl) - normalhexanoic acid melts at 64°–65° C. and boils at 183° C. at 3 millimeters pressure. Alpha - (alpha - naphthyl) - phenylacetic acid melts at 139°–140° C. The omega-dialkylamino-alkyl chlorides and omega-dialkylamino-alkanols employed in the preparation of the new compounds are known derivatives.

The preparation of compounds conforming to the generic formula hereinabove is illustrated in the following examples, the first of which is directed to a specific compound claimed herein.

*Example 1*

0.015 molar amounts of alpha-(alpha-naphthyl)-normalbutyric acid and beta-piperidino-ethyl chloride were dispersed in 8 volumes of dry isopropyl alcohol and the mixture heated to the boiling temperature and under reflux for 40 hours. The alcohol was recovered by evaporation on a steam bath and the residue washed with absolute ethanol and recrystallized from anhydrous ethyl acetate to obtain beta-piperidino-ethyl alpha-(alpha-naphthyl)-normalbutyrate hydrochloride melting at 139°–140° C. Its formula is

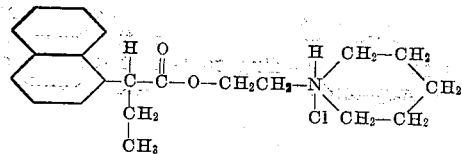

*Example 2*

4.28 grams (0.02 mole) of alpha-(alpha-naphthyl)-normalbutyric acid and 7 milliliters of thionyl chloride were mixed together and heated to boiling and under reflux for 2 hours. The excess thionyl chloride was removed by warming the mixture on a steam bath under reduced pressure and adding and distilling benzene out of the mixture. To the residue from this operation, consisting essentially of alpha-(alpha-naphthyl)-butyryl chloride, was added portion-wise and with stirring 2.98 grams (0.0275 mole) of beta-morpholinoethanol dissolved in 20 milliliters of dry benzene. The resulting mixture was heated to boiling temperature and under reflux for 2 hours, and the benzene then distilled out under reduced pressure. The crystalline residue was dispersed in 50 milliliters of dilute aqueous hydrochloric acid and the mixture extracted with ethyl ether. The aqueous layer was separated and made alkaline with dilute sodium carbonate. The ester precipitated by this operation was taken up in ether, and the ether solution washed with water and dried over anhydrous magnesium sulfate. Evaporation of the ether yielded a residue of beta-morpholino-ethyl alpha-(alpha-naphthyl)-normalbutyrate as a clear oil. This product was dissolved in anhydrous diethyl ether and gaseous hydrogen chloride passed therethrough, whereupon the crystalline ester hydrochloride was precipitated. Upon filtration of the mixture, there was obtained 4.4 grams of beta-morpholino-ethyl alpha-(alpha-naphthyl)-normalbutyrate hydrochloride as a crystalline solid melting at 167°–168° C.

By substituting other reactants for those shown in the preceding examples closely related compounds have been prepared. The following are representative:

Beta-piperidino-ethyl alpha-naphthyl-acetate hydrochloride melting at 122°–124° C. This compound was prepared by reacting together beta-piperidino-ethyl chloride and alpha-naphthyl-acetic acid.

Beta-morpholino-ethyl alpha-naphthyl-acetate hydrochloride melting at 131°–132° C. This compound was prepared by reacting alpha-naphthyl-acetyl chloride with beta-morpholino-ethanol to form the free basic-alkyl ester, and thereafter reacting this ester with hydrogen chloride.

Beta - piperidino - ethyl alpha - (alpha - naphthyl)-propionate hydrochloride melting at 115°–117° C. This compound was prepared by reacting beta-piperidino-ethyl chloride with alpha-(alpha-naphthyl)-propionic acid.

Beta - morpholino - ethyl alpha-(alpha-naphthyl)-propionate hydrochloride melting at 148°–149° C. This compound was prepared by reacting together alpha - (alpha - naphthyl) - propionyl chloride and beta-morpholino-ethanol to form the free basic-alkyl ester, and treating this ester with gaseous hydrogen chloride.

Beta - piperidino - ethyl alpha - (alpha-naphthyl)-phenylacetate hydrochloride melting at 167°–168° C. In the preparation of this compound, beta-morpholino-ethyl chloride was reacted with alpha-(alpha-naphthyl)-phenylacetic acid.

Beta - morpholino - ethyl alpha-(alpha-naphthyl)-phenylacetate hydrochloride melting at 110° C. This compound was prepared by reacting beta-morpholino-ethanol with alpha - (alpha-naphthyl)-phenylacetyl chloride to form the free basic-alkyl ester, and treating the latter with gaseous hydrogen chloride.

In a similar fashion alpha-(alpha-naphthyl)-normalpentanoic acid and alpha-(alpha-naphthyl)-normalhexanoic acid or their acid chlorides may be reacted with suitable basic-alkyl halides or basic-alkanols to obtain such compounds as beta-morpholino-ethyl alpha-(alpha-naphthyl)-normalpentanoate and its hydrochloride, and gamma - piperidino - propyl alpha-(alpha-naphthyl) -normalhexanoate and its hydrochloride and hydrobromide. By substituting other basic-alkyl halides and basic-alkanols for those shown in the foregoing examples, compounds such as beta-piperazino-ethyl alpha - naphthyl - acetate, beta - piperazino - ethyl alpha-naphthyl-acetate hydrochloride, gamma - thiomorpholino - propyl alpha-(alpha-naphthyl) - propionate hydrochloride, gamma - piperidino - propyl alpha-(alpha-naphthyl) - normalbutyrate, delta - piperidino-butyl alpha - (alpha-naphthyl) -normalbutyrate hydrochloride, delta - morpholino - butyl alpha-(alpha-naphthyl) -phenyl-acetate, delta-piperidino-butyl alpha-(alpha-naphthyl) -phenylacetate hydrochloride, delta - morpholino - butyl alpha-(alpha-naphthyl) - phenylacetate hydrobromide, beta - thiomorpholino-ethyl alpha-(alpha-naphthyl) -normalpentanoate hydrochloride, beta-piperazino-ethyl alpha-(alpha-naphthyl) -normalhexanoate hydrochloride, etc. may be formed.

Other salts which may be prepared by reacting the free basic-alkyl esters obtained in accordance with the teaching of the preceding examples with suitable acids and acid anhydrides include beta-morpholino-ethyl alpha-naphthyl-acetate methosulfate, gamma-piperidino-propyl alpha-(alpha-naphthyl) -propionate tartrate, gamma-piperazino-propyl alpha-(alpha-naphthyl) -butyrate hydroiodide, beta-thiomorpholino-ethyl alpha-(alpha - naphthyl) - normalbutyrate hydroacetate, delta - piperidino - normalbutyl alpha - (alpha-naphthyl) -phenylacetate neutral sulfate, gamma-piperazino-propyl alpha-(alpha-naphthyl) -normalbutyrate citrate, etc.

While the foregoing examples have been primarily concerned with the preparation of basic-alkyl esters and ester salts of alpha-naphthyl-acetic, alpha-(alpha-naphthyl) -propionic, alpha-(alpha-naphthyl) -normalbutyric and alpha-(alpha-naphthyl) -phenylacetic acids, closely related derivatives falling within the scope of the present invention may be obtained through similar operation with such compounds as alpha-(alpha-naphthyl) -cyclohexylacetic acid, alpha-(alpha-naphthyl) -phenylpropionic acid, alpha-(alpha-naphthyl) -normalhexenoic-delta-4 acid, etc., or with the corresponding acid chlorides. By reacting such acids with beta-piperidino-ethyl chloride, gamma - morpholino - propyl chloride, beta-piperazino-ethyl bromide, beta-thiomorpholino-ethyl bromide, delta-piperidino-butyl chloride, gamma-piperazino-propyl bromide, etc., or the acid chlorides with the corresponding piperidino-, morpholino-, thiomorpholino-, or piperazino-alkanols, the following basic-alkyl esters may be obtained: beta-piperidino-ethyl alpha-(alpha-naphthyl) -cyclohexylacetate and its hydrochloride, beta - morpholino - ethyl alpha-(alpha-naphthyl) -cyclohexylacetate and its hydroiodide, beta-piperazino-ethyl alpha-(alpha-naphthyl) -cyclohexylacetate and its hydrochloride, beta-thiomorpholino-ethyl alpha-(alpha-naphthyl) -cyclohexylacetate and its hydrochloride, gamma - piperidino - propyl alpha - (alpha-naphthyl) -phenylpropionate and its hydrochloride, beta-morpholino-ethyl alpha-(alpha-naphthyl) -phenylbutyrate and its hydrochloride, delta-piperazino - butyl alpha - (alpha - naphthyl) -phenylpropionate and its hydrochloride, beta-thiomorpholino - ethyl alpha-(alpha-naphthyl) -phenylbutyrate and its hydrochloride, beta-piperidino-ethyl alpha-(alpha-naphthyl) -normalhexenoate-delta-4 and its hydrochloride, gamma-morpholino-propyl alpha-(alpha-naphthyl) -normalhexenoate-delta-4 and its hydrochloride, etc.

Especially preferred embodiments of the present invention are the omega-piperidino- and omega-morpholino-alkyl esters of alpha-(alpha-naphthyl) -propionic, normalbutyric, and phenylacetic acids and particularly the hydrochlorides thereof. While all of the compounds herein disclosed are adapted to be employed as active constituents of antispasmodic compositions, the indicated derivatives have been found to be exceptionally effective. Representative of the results obtained with these derivatives is the effect exerted upon isolated rabbit intestine according to the technique of Magnus. Thus beta-piperidino-ethyl alpha - (alpha - naphthyl) -normalbutyrate hydrochloride at a dilution of between 1 to 1,000,000 and 1 to 2,000,000 was effective in relaxing the unstimulated intestine segment. Beta-morpholino-ethyl alpha-(alpha-naphthyl) -propionate hydrochloride and beta-morpholino-ethyl alpha-(alpha-naphthyl) -phenylacetate hydrochloride were effective at a dilution of 1 to 400,000.

I claim:
1. Beta - piperidino-ethyl alpha-(alpha-naphthyl) -normalbutyrate hydrochloride melting at 139°–140° C.
2. A compound selected from the group consisting of beta - piperidino - ethyl-alpha-(alpha-naphthyl) -normalbutyrate and its acid addition salts.

FREDERICK F. BLICKE.

REFERENCES CITED

The following references are of record in the file of this patent:

UNITED STATES PATENTS

| Number | Name | Date |
|---|---|---|
| 2,079,962 | Miescher et al. | May 11, 1937 |
| 2,374,525 | Cheney | Apr. 24, 1945 |

OTHER REFERENCES

Journal American Chemical Society, vol. 64, pages 970–973.
Journal American Chemical Society, vol 65, pages 262–267.
Journal American Chemical Society, vol. 65, pages 1582–1585.